(No Model.)

W. J. O. BRYON, Jr.
COMBINED PRESSURE GAGE AND REGISTER.

No. 487,515. Patented Dec. 6, 1892.

Witnesses:—
D. H. Hayward
Annie L. Hayes.

Inventor:—
William J. O. Bryon Jr.
by Chas. F. Dane
his Atty

UNITED STATES PATENT OFFICE.

WILLIAM J. O. BRYON, JR., OF NEW YORK, N. Y.

COMBINED PRESSURE GAGE AND REGISTER.

SPECIFICATION forming part of Letters Patent No. 487,515, dated December 6, 1892.

Application filed September 11, 1891. Serial No. 405,389. (No model.)

*To all whom it may concern:*

Be it known that I, WILLIAM J. O. BRYON, Jr., a citizen of the United States, and a resident of the city, county, and State of New York, have invented a Combined Gage and Register, of which the following description, taken in connection with the drawings herewith accompanying, is a specification.

This invention consists in the construction of a combined gage and register more especially adapted for use in combination with a hydraulic rowing or exercising machine, whereby the pressure to the stroke and the distance or number of feet covered for a single stroke or a successive number of strokes (such distance being gaged by a given number of feet for a given number of pounds pressure) may be indicated to the operator or other observer during practice and be registered, the relation between the pressure and distance being arbitrary, the object of this invention being to test the strength and endurance of the operator during a given length of time and also to show the distance or number of feet covered during said length of time, thus making it possible for trials of speed, strength, &c., to be given between different persons and have the result during the progress of the same visible to the operator and other observers.

Figure 2:
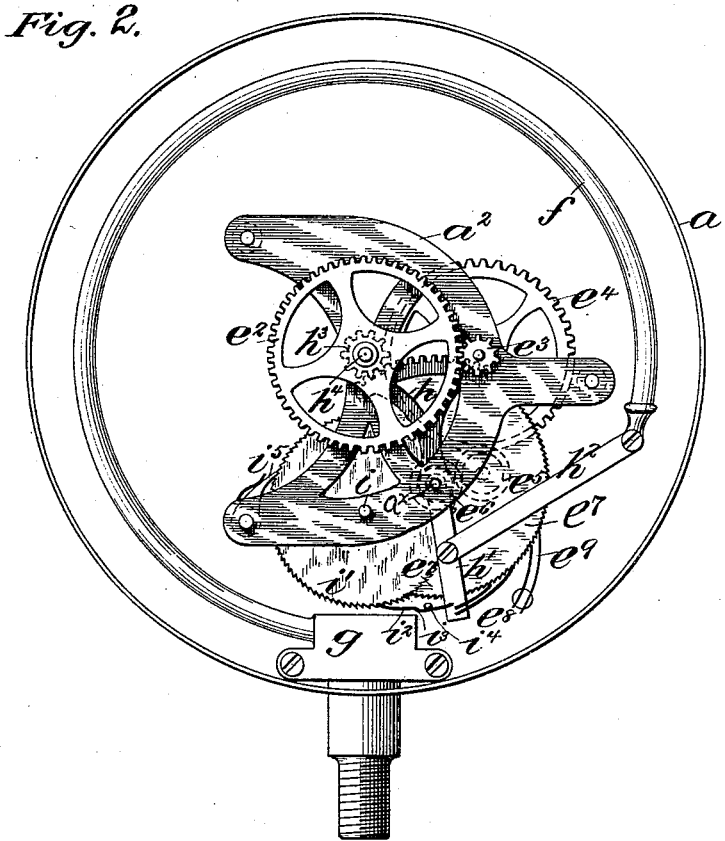
Figure 1:
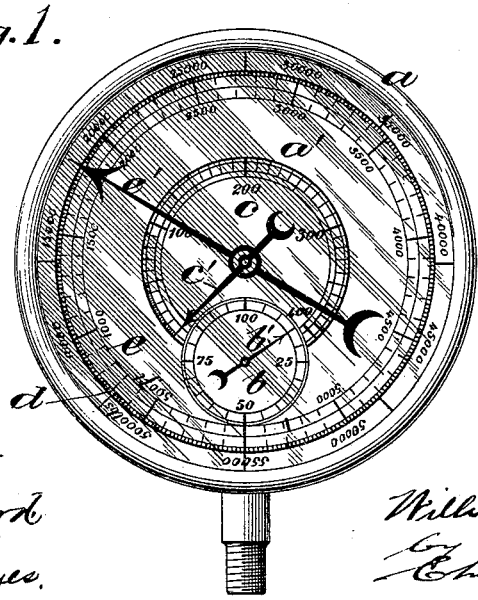

Referring to the drawings, Figure 1 represents a face view of my improved device; and Fig. 2, a view of the same enlarged, with the face-plate removed, showing the operating mechanism for the indicating-hands.

To explain in detail, $a$ represents the outer supporting-case, and $a'$ the dial or face-plate. The said face-plate is marked off or gaged to show four different results of the operations of the operator through the medium of the indicating-hands, as follows: a register $b$ to denote the number of strokes taken by the operator, a gage $c$ to denote the number of pounds pressure exerted at each individual stroke, a register $d$ to denote the multiplied pounds pressure during a successive number of strokes or for a given time, and a register $e$ to denote the distance or number of feet covered during a given time, thus enabling the work of the rower or operator to be observed during the course of his operations, as well as the result at the end of a given time.

The mechanism for operating the indicating-hands, as clearly shown in Fig. 2, consists of the hollow pressure-spring $f$, which at one end is attached to and supported by the inlet-pipe $g$ and extends in a circle, or nearly so, part way around the inner wall of the case and at its free end is closed in such manner that when the water or other matter is forced into the same at the forward stroke of the piston said free end is forced or sprung outward or toward the outer wall of the case to a greater or less extent, according to the pressure of the water forced therein, and at the backward stroke of the piston the pressure is relieved and the free end of said pressure-spring moves back to its normal position, thus giving a vibratory motion to the end of said spring at the forward and backward stroke of the piston, as will be readily understood. A sector $h$, pivoted at $a^\times$ to a supporting bracket or frame $a^2$, is vibrated by the action of said pressure-spring through the medium of a connecting-rod $h^2$ and meshes with a gear $h^3$, located on the spindle $h^4$, which carries the pressure-indicating hand $c'$ to operate the latter, and as the degree of pressure regulates the distance of vibration of the pressure-spring the indicating-hand $c'$, being operated thereby, as described, indicates the pressure by the gage $c$, as will be readily understood.

The stroke-pointer $b'$ is operated through the medium of its supporting spindle $i$ and a ratchet $i'$, secured thereon, by means of a pawl $i^2$, carried by the arm or extension $h'$ of the vibrating sector $h$. This pawl is adapted to engage with the said ratchet $i$ to move the same and the indicating-hand connected therewith at each backward throw or vibration of the pressure-spring $f$, and thus register the stroke, it being understood that each stroke of the oar causes the said pressure-spring to vibrate by reason of the action of the piston (operated by said oar) forcing the water or other matter into said pressure-spring. The pawl $i^2$ is adapted to engage with each succeeding tooth of the ratchet $i'$ at each backward movement. In order to carry the connecting indicating-hand $b'$ forward the same distance at each stroke and to prevent said pawl from engaging other than the next succeeding tooth when drawn back a greater or less distance, I provide said pawl with a shoulder, as shown at $i^3$, which is adapted to engage with a pin or projection $i^4$, located on the supporting-case, to raise its engaging end from contact with the ratchet $i'$ in such manner that when again moved forward it is guided by said projection to engage with the succeeding tooth and move the wheel forward a given distance. A stop-pawl $i^5$ is pivoted on the bracket $a^2$ for engaging said wheel or disk $i'$ to prevent its backward movement.

The indicating-hand $e'$ serves as the indicator for both the distance or "mile" register $e$ and the outer pressure-register $d$. This hand is connected with a toothed wheel $e^2$, which is supported on a sleeve or support on the bracket $a^2$ through the medium of a connecting-stem extending through the face or dial plate $a'$, and said wheel $e^2$ is operated through the medium of suitable gearing, as will be described, to move the connecting indicating-hand $e'$ forward the proper distance to indicate the number of feet covered at each stroke and also to indicate the additional pressure during the successive strokes. The said hand-carrying wheel $e^2$ is operated through the medium of gearing (represented at $e^3$, $e^4$, $e^5$, and $e^6$) by means of a ratchet $e^7$, the latter being journaled in the back casing or in appropriate supports and operated by pawls $e^8$, carried by the arm $h'$ of the vibrating sector $h$. Stop-pawls $e^9$ for engaging said ratchet $e^7$ to prevent its backward movement, are supported on a post or projection $e^{10}$, located on the wall of the case $a$, as clearly shown.

The described gearing and other connection between the distance-indicating hand $e'$ and stroke-hand $b'$ and the operating pressure-spring $f$ are so arranged and gaged as to cause the hand $e'$ to move forward a greater or less distance at each movement of the pressure-spring, according to the movement of the latter, and indicate both the distance and number of pounds pressure by means of the graduated dial, as described, and the stroke-hand $e'$ is moved forward at each movement of the pressure-spring to indicate the number of strokes of the latter.

Having thus set forth my invention, what I claim as new, and desire to secure by Letters Patent of the United States, is—

1. A combined gage and register provided with a pressure-hand and a distance-indicating-hand, suitable dials in combination with said hands, and mechanism for operating said hands in a manner whereby the distance or number of feet gaged by a given number of feet to a given number of pounds pressure covered by a single and successive number of strokes of the pressure-hand may be indicated, substantially as described, and for the purpose set forth.

2. A combined gage and register provided with a dial having a graduated surface to indicate distance and pressure, the indicating-hand $e'$, and mechanism, substantially as described, for operating said indicating-hand in a manner whereby the pressure for a single and successive number of strokes and the distance or number of feet covered by such strokes may be indicated, substantially as described, and for the purpose set forth.

3. A combined gage and register provided with a dial, a pressure-spring, a "stroke-indicating" hand, so called, and mechanism for connecting said pressure-spring and indicating-hand to give the latter a continuous forward step-by-step movement at each stroke of said pressure-spring, substantially as described, and for the purpose set forth.

WILLIAM J. O. BRYON, JR.

Witnesses:
CHAS. F. DANE,
ANNIE L. HAYES.